US 8,213,780 B2

(12) United States Patent
Nakagawa

(10) Patent No.: US 8,213,780 B2
(45) Date of Patent: Jul. 3, 2012

(54) INFORMATION RECORDING/REPRODUCING APPARATUS, INFORMATION RECORDING/REPRODUCING METHOD, AND RECORDING MEDIUM STORING PROGRAM

(75) Inventor: Masaaki Nakagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1536 days.

(21) Appl. No.: 11/384,343

(22) Filed: Mar. 21, 2006

(65) Prior Publication Data

US 2006/0198604 A1    Sep. 7, 2006

Related U.S. Application Data

(63) Continuation of application No. PCT/JP2004/010958, filed on Jul. 30, 2004.

(30) Foreign Application Priority Data

Sep. 29, 2003  (JP) .................................. 2003-337854
May 27, 2004  (JP) .................................. 2004-157607

(51) Int. Cl.
  *H04N 5/76*   (2006.01)
  *H04N 5/783*  (2006.01)
(52) U.S. Cl. ........................................ 386/344; 386/298
(58) Field of Classification Search ................ 386/85–87
  See application file for complete search history.

(56) References Cited

U.S. PATENT DOCUMENTS

| 6,754,442 | B1 * | 6/2004 | Nagai et al. | ................... 386/125 |
| 7,174,092 | B2 | 2/2007 | Nagai | |
| 7,177,528 | B1 * | 2/2007 | Yada et al. | ................... 386/111 |
| 2004/0005144 | A1 * | 1/2004 | Endo et al. | ....................... 386/96 |

FOREIGN PATENT DOCUMENTS

| JP | 11-306641 A | 11/1999 |
| JP | 11-306662 | 11/1999 |
| JP | 2000-100057 A | 4/2000 |
| JP | 2001-45419 | 2/2001 |
| JP | 2001-101795 | 4/2001 |
| JP | 2001-176186 | 6/2001 |
| JP | 2002-230907 | 8/2002 |
| JP | 2002-367276 | 12/2002 |
| JP | 2003-151139 | 5/2003 |
| WO | WO-03-050806 | 6/2003 |

* cited by examiner

*Primary Examiner* — William C Vaughn, Jr.
*Assistant Examiner* — Heather Jones
(74) *Attorney, Agent, or Firm* — Dickstein Shapiro LLP

(57) ABSTRACT

An information recording/reproducing apparatus is disclosed. The information recording/reproducing apparatus includes a recording/reproducing unit that records an information item into, and reproduces an information item from, a recording medium, and a determining unit that determines, when a reproduction error occurs during reproduction of the information item by the recording/reproduction unit, whether the information item is a video data item, and prevents changing a reproduction speed of the recording/reproduction unit during reproduction if the determining unit determines that the information item is a video data item, and allows changing the reproduction speed during reproduction if the determining unit determines that the information items is not a video data item.

19 Claims, 6 Drawing Sheets

FIG.5

| BYTE/BIT | 7 | 6 | 5 | 4 | 3 | 2 | 1 | 0 |
|---|---|---|---|---|---|---|---|---|
| 0 | OperationCode (D0h) | | | | | | | |
| 1 | Reserved | | | | | | | |
| 2 | Reserved | | | | | | | |
| 3 | Reserved | | | | | | | |
| 4 | Reserved | | | | | | | |
| 5 | Reserved | | | | | | | VM 〜20 |
| 6 | Reserved | | | | | | | |
| 7 | Reserved | | | | | | | |
| 8 | Reserved | | | | | | | |
| 9 | Reserved | | | | | | | |
| 10 | Reserved | | | | | | | |
| 11 | Reserved | | | | | | | |

FIG.6

| BYTE/BIT | 7 | 6 | 5 | 4 | 3 | 2 | 1 | 0 |
|---|---|---|---|---|---|---|---|---|
| 0 | OperationCode (A8h) | | | | | | | |
| 1 | Reserved | | | DPO | FUA | Reserved | | RelAdr |
| 2 | (MSB) Logical Block Address | | | | | | | |
| 3 | | | | | | | | |
| 4 | | | | | | | | |
| 5 | | | | | | | | (LSB) |
| 6 | (MSB) Transfer Length | | | | | | | |
| 7 | | | | | | | | |
| 8 | | | | | | | | |
| 9 | | | | | | | | (LSB) |
| 10 | Streaming | Reserved | | | | | | |
| 11 | Reserved | | | | | | | |

21

INFORMATION RECORDING/REPRODUCING APPARATUS, INFORMATION RECORDING/REPRODUCING METHOD, AND RECORDING MEDIUM STORING PROGRAM

CROSS-REFERENCE TO RELATED APPLICATIONS

This is a U.S. continuation application filed under 35 USC 111(a) claiming benefit under 35 USC 120 and 365(c) of PCT application JP2004/010958, filed on Jul. 30, 2004, which claims priority to Application Ser. No. 2003-337854 filed on Sep. 29, 2003, and Ser. No. 2004-157607 filed on May 27, 2004, with the Japanese Patent Office. The foregoing applications are hereby incorporated herein by reference.

BACKGROUND OF THE INVENTION

1. Field of the Invention

The present invention relates to an optical disk drive of a DVD recording/reproducing apparatus, a CD recording/reproducing apparatus, or the like; an information recording/reproducing apparatus such as a CD/DVD recorder; an information recording/reproducing method; and a recording medium storing a program.

2. Description of the Related Art

Information reproducing apparatuses disclosed in, for example, Japanese Patent Laid-Open Publication NO. 2002-367276 are configured to reproduce data from DVD video discs at a speed lower than the speed of reproducing data from DVD-ROM discs in order to prevent noise and vibration during reproduction of the video data.

There is a technique for reproducing a portion of image information (data) from TV broadcasting already recorded in a DVD disc while recording the rest of the image information into the DVD disc. When this technique is employed, information recording/reproducing apparatuses alternately perform recording and reproduction of information. Generally, in the information recording/reproducing apparatuses, the rotational speed of reproduction (reproduction speed) is higher than the rotational speed of recording (recording speed).

When reproducing file data excluding video data, the information recording/reproducing apparatuses might need to perform seek operation more than one time for reproduction of one file because the file data are often spread across an optical disk.

In such a case, the lower the rotational speed, the more time it takes for reading the data. Therefore, the reproduction speed needs to be increased.

On the other hand, in the case of reproducing data recorded in series such as video data, unlike related art information recording/reproducing apparatuses, the reproduction speed of the video data does not need to be increased and may be low enough to prevent jumpiness of video data because of no need to perform seek operation as well as its bit rate.

If the maximum recording speed of DVD discs achieved by an information recording/reproducing apparatus is 4×CLV and the maximum reproduction speed is 10×CAV, the speed is changed each time switching between recording and reproduction of data in an optical disk occurs. Due to this speed changing, recording and reproducing performances are lowered, leading to a problem in the function of reproducing the already-recorded portion of data from TV broadcasting while recording the rest of the data.

More specifically, a problem such as being unable to record the rest of the data from the TV broadcasting, or being unable to provide smooth moving image reproduction might occur.

SUMMARY OF THE INVENTION

The present invention may solve at least one problem described above. A preferred embodiment of the present invention may prevent lowering of recording and reproducing performances while alternately performing recording of information into, and reproduction of information from, a recording medium.

According to an aspect of the present invention, there is provided an information recording system, comprising: a recording/reproducing device that records an information item into, and reproduces an information item from, a recording medium; and a host device, wherein the host device requests the recording/reproducing device to perform reproduction, and the recording/reproducing device, after receiving the reproduction request from the host device, performs the reproduction at a maximum reproduction speed when a data recording operation is finished, and when the data recording operation is not finished, the recording/reproducing device performs the reproduction at a reproduction speed the same as a recording speed in the data recording operation.

BRIEF DESCRIPTION OF THE DRAWINGS

FIG. 5 shows a format of a SET DATA MODE command, which is a vendor unique command for specifying a recording data mode; and FIG. 6 shows a format of a READ (12) command.

DETAILED DESCRIPTION OF THE PREFERRED EMBODIMENT

The following describes preferred embodiments of the present invention with reference to the accompanying drawings.

Figure 1A:
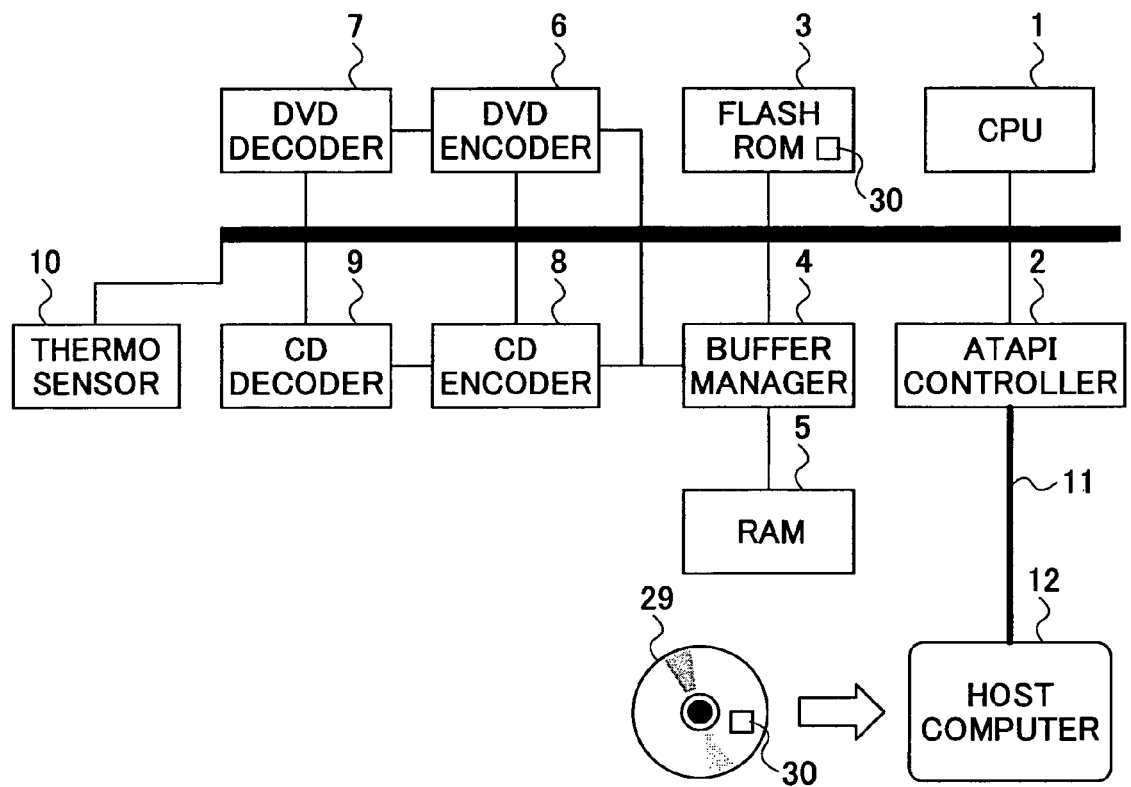
FIG. 1A is a block diagram showing a configuration of a CD/DVD reproducing/recording drive apparatus according to an embodiment of the present invention.

FIG. 1A is a block diagram showing a configuration of a CD/DVD reproducing/recording drive apparatus according to an embodiment of the present invention.

The CD/DVD reproducing/recording drive apparatus is an information recording/reproducing apparatus capable of recording information (data) into, and reproducing information from, optical disks such as CD-R discs, CD-RW discs, DVD-R discs, DVD-RW discs, DVD+R discs, DVD+RW discs, and DVD-RAM discs.

The CD/DVD reproducing/recording drive apparatus comprises a CPU 1, an ATAPI controller 2, a flash ROM 3, a buffer manager 4, a RAM 5, a DVD encoder 6, a DVD decoder 7, a CD encoder 8, a CD decoder 9, and a thermo sensor 10.

The CPU 1 is a central processing LSI (microcomputer) for controlling operations of the CD/DVD reproducing/recording drive apparatus. The CPU 1 implements an information recording/reproducing method as an embodiment of the present invention by running a firmware program stored in the flash ROM 3 to provide functions of the information recording/reproducing apparatus as an embodiment of the present invention.

The ATAPI controller 2 is an LSI that controls data communication between a host computer 12 and the CD/DVD reproducing/recording drive apparatus.

The flash ROM 3 is a nonvolatile memory that is erasable and rewritable by the CPU 1 and stores a control program for controlling the CD/DVD reproducing/recording drive apparatus and the firmware program including a program 30 for executing information recording/reproducing steps according to an embodiment of the present invention.

The buffer manager 4 is an LSI for controlling transmission of data sent from the host computer 12 and data read from an optical disk as a recording medium 29.

The RAM 5 is a memory for temporarily holding data sent from the host computer 12 and data read from the optical disk.

The DVD encoder 6 is an LSI for modulating data before writing (recording) DVD data into the optical disk. The DVD decoder 7 is an LSI for demodulating the DVD data read (reproduced) from the optical disk.

The CD encoder 8 is an LSI for modulating data before writing CD data into the optical disk. The CD decoder 9 is an LSI for demodulating the CD data reproduced from the optical disk.

The thermo sensor 10 is a temperature sensor such as an IC for measuring the temperature inside the CD/DVD reproducing/recording drive apparatus.

The host computer 12 is an information processing apparatus, such as a personal computer with a microcomputer comprising a CPU, a ROM, a RAM, etc., that sends various commands (instructions) such as a recording command and a reproduction command to the CD/DVD reproducing/recording drive apparatus via a host interface 11.

Figure 1B:
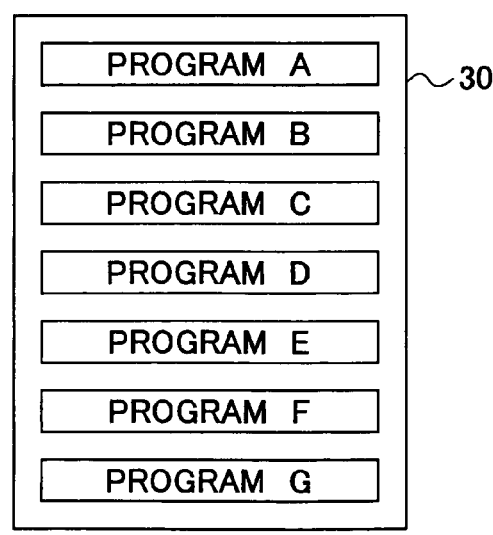
FIG. 1B is a block diagram showing a configuration of a program according to an embodiment of the present invention.

The recording medium 29 stores the program 30 as an embodiment of the present invention. As shown in FIG. 1B, the program 30 includes programs A through G, and causes the CPU 1 to execute the information recording/reproducing steps according to an embodiment of the present invention. The recording medium 29 is for optically, electrically, or magnetically recording information therein, and may be, e.g., an optical disk such as a CD or a DVD, a memory card including a flash memory, a flexible disk, a magneto optical disk or the like. That is, the recording medium 29 may be any suitable medium that can record information therein.

The program A causes the CPU 1 to execute a recording/reproducing step of recording an information item into, and reproducing an information item from the recording medium 29. The program B causes the CPU 1 to execute a step of, in a case where a process of reproduction of an already-recorded portion of the information item while recording a yet-to-be-recorded portion of the information item is performed, setting the reproduction speed to the same speed as a recording speed during the process of alternately performing the reproduction and the recording, and setting the reproduction speed to a maximum speed when the process of alternately performing the recording and the reproduction is finished. The program C causes the CPU 1 to execute a step of, in a case where a process of reproduction of an already-recorded portion of the information item while recording a yet-to-be-recorded portion of the information item in the recording medium is performed, setting the reproduction speed to the same speed as a recording speed if the reproduction is followed by the recording, and setting the reproduction speed to a maximum speed if the reproduction is not followed by the recording. The program D causes the CPU 1 to execute a step of, in a case where a process of reproduction of an already-recorded portion of the information item while recording a yet-to-be-recorded portion of the information item in the recording medium is performed, determining whether the recording of the information item has been performed upon reception of a reproduction command from the host computer 12, and setting a reproduction speed of reproduction indicated by the information reproduction command to the same speed as a recording speed of the last recording if it is determined that the recording of the information item has been performed. The program E causes the CPU 1 to execute a step of, when a reproduction error occurs during the reproduction of the information item in the recording/reproduction step, determining whether the information item is a video data item, and preventing changing a reproduction speed during reproduction if it is determined that the information item is a video data item, and allowing changing the reproduction speed during reproduction if it is determined that the information item is not a video data item. The program F causes the CPU 1 to execute a step of changing the reproduction speed to the maximum speed if an information recording command is not received from the host computer 12 after a predetermined amount of time has passed since the reproduction of the information item was started in the recording/reproducing step. The program G causes the CPU 1 to execute a step of identifying whether the information item is a video data item before the recording of the information item is started according to a command from the host computer 12.

The recording medium 29 is loaded into an optical disk drive or a memory card reader (neither shown) of the host computer 12 such that the host computer 12 installs the programs A through G into the flash ROM 3. In an alternative embodiment, the programs A through G may be downloaded via a network.

The following describes reproduction processes performed by the CD/DVD reproducing/recording drive apparatus. In the case where a video data item is being reproduced using a time slip function (which allows reproduction of an already-recorded portion of a data item from an optical disk while recording the rest of the data item into the optical disk), in order to prevent lowering of recording and reproducing performances, the CD/DVD reproducing/recording drive apparatus does not allow setting the rotational speeds of the recording and the reproduction to different speeds.

For example, in the case where an already-recorded portion of a data item from TV broadcasting is reproduced from a DVD while recording the rest of the data item into the DVD, if the rotational speed of the recording and the rotational speed of the reproduction are different, the recording and reproducing performances are lowered, leading to a problem in the function of reproducing the already-recorded portion of the data item from the TV broadcasting while recording the rest of the data item.

More specifically, a problem such as being unable to record the rest of the data item from the TV broadcasting, or being unable to provide smooth moving image reproduction might occur.

In view of such a problem, in the case where the CD/DVD reproducing/recording drive apparatus alternately performs recording and reproduction so as to reproduce a not-yet-fully-recorded data item from an optical disk while recording the rest of the data item into the optical disk, the CD/DVD reproducing/recording drive apparatus does not allow setting the reproduction speed and the recording speed to different speeds, thereby preventing lowering of recording and reproducing performances.

The following describes a first reproduction process performed by the CD/DVD reproducing/recording drive apparatus, wherein setting the reproduction speed and the recording speed to different speeds is not allowed in the case where recording and reproduction are alternately performed so as to reproduce the already-recorded portion of a data item from an optical disk while recording the rest of the data item into the optical disk.

Figure 2:
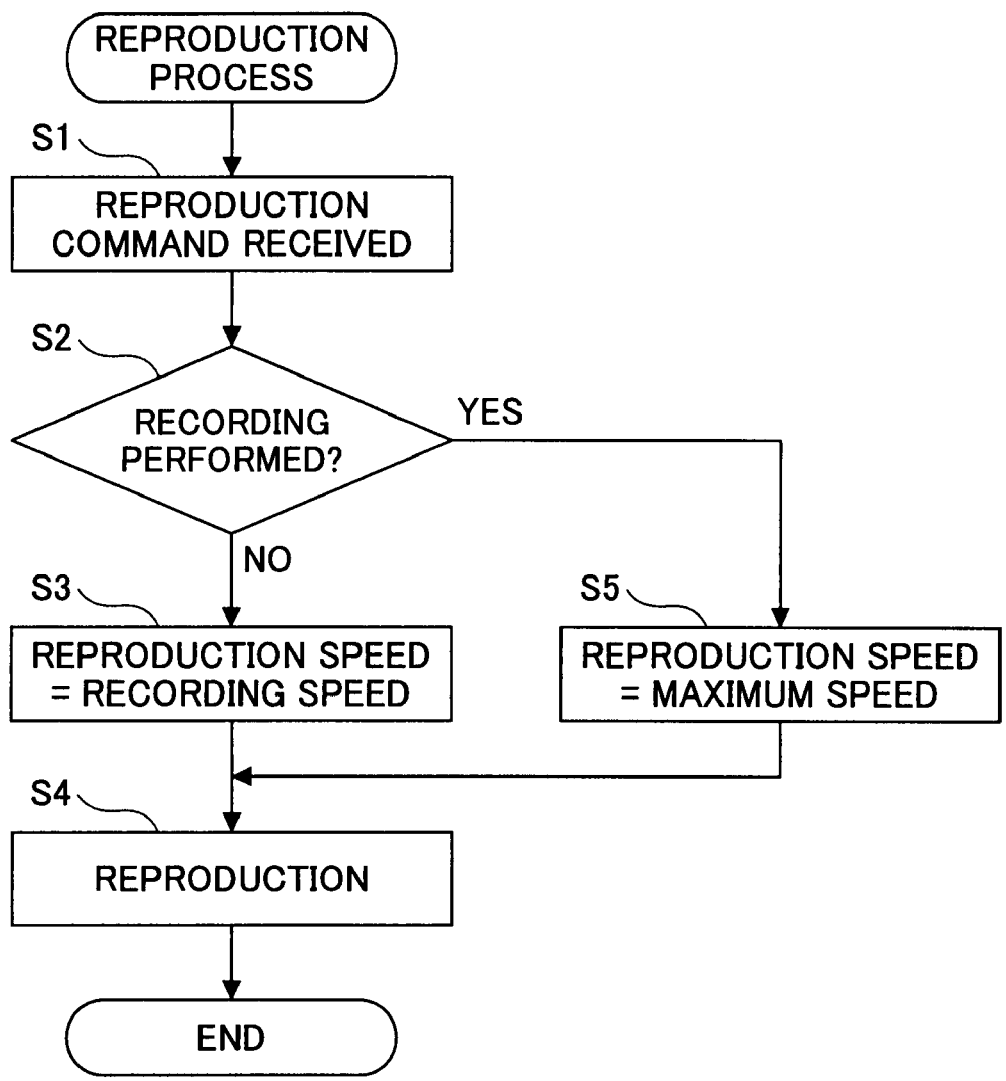
FIG. 2 is a flowchart illustrating a first reproduction process performed by the CD/DVD reproducing/recording drive apparatus of FIG. 1.

FIG. 2 is a flowchart illustrating the first reproduction process performed by the CD/DVD reproducing/recording drive apparatus of FIG. 1.

In the case where reproduction of an already-recorded portion of a data item from an optical disk and recording of a yet-to-be-recorded portion of the data item into the optical disk are alternately performed, when a data reproduction command is received from the host computer 12 in Step S1, the CPU 1 determines whether recording of the data item has been performed before reproduction in Step S2.

If the CPU 1 determines that recording of the data item has been performed before reproduction in Step S2, the CPU 1 changes the reproduction speed to the maximum speed achievable by the CD/DVD reproducing/recording drive apparatus in Step S5, namely, the CPU 1 sets the reproduction speed to the maximum speed when a process of alternately performing the recording and reproduction is finished in Step S5. Then, in Step S4, the reproduction is performed at the thus specified speed, and the first reproduction process is thus completed.

If, on the other hand, the CPU 1 determines that recording of the data item has not been performed before reproduction, in Step S3, since there is a possibility of receiving a recording command again after the reproduction, the CPU 1 sets the reproduction speed of the reproduction initiated by the reproduction command to be the same as the recording speed of the last recording, namely, the CPU 1 sets the reproduction speed to be the same as the recording speed when reproduction of an already-recorded portion of a data item from an optical disk and recording of a yet-to-be-recorded portion of the data item into the optical disk are alternately performed.

That is, the reproduction speed of the reproduction is the same as the recording speed of, for example, 4 times CLV. Then the reproduction is performed at the specified speed in Step S4, and the first reproduction process is thus completed.

If, on the other hand, the CPU 1 determines that recording of the data item has not been performed before reproduction (i.e., when reproduction is not followed by additional recording), the CPU 1 changes the reproduction speed to the maximum speed that can be achieved by the CD/DVD reproducing/recording drive apparatus (i.e. the CPU 1 sets the reproduction speed to the maximum speed when a process of alternately performing the recording and reproduction is finished) in Step S5. Then the reproduction is performed at the set speed in Step S4. The first reproduction process is thus completed.

As described above, since the reproduction speed of the reproduction that follows after the recording of the data item is the same as the recording speed, it is possible to prevent lowering of the recording and reproducing performances of the function that alternately performs recording and reproduction such as the time slip reproduction function.

In case a reproduction error occurs upon reproducing a data item that requires reliability, such as a document data item, the reproduction speed may be changed if the error cannot be otherwise corrected without reducing the reproduction speed.

The following describes a second reproduction process performed by the CD/DVD reproducing/recording drive apparatus, wherein the reproduction speed is changed upon occurrence of a reproduction error during reproduction.

Figure 3:
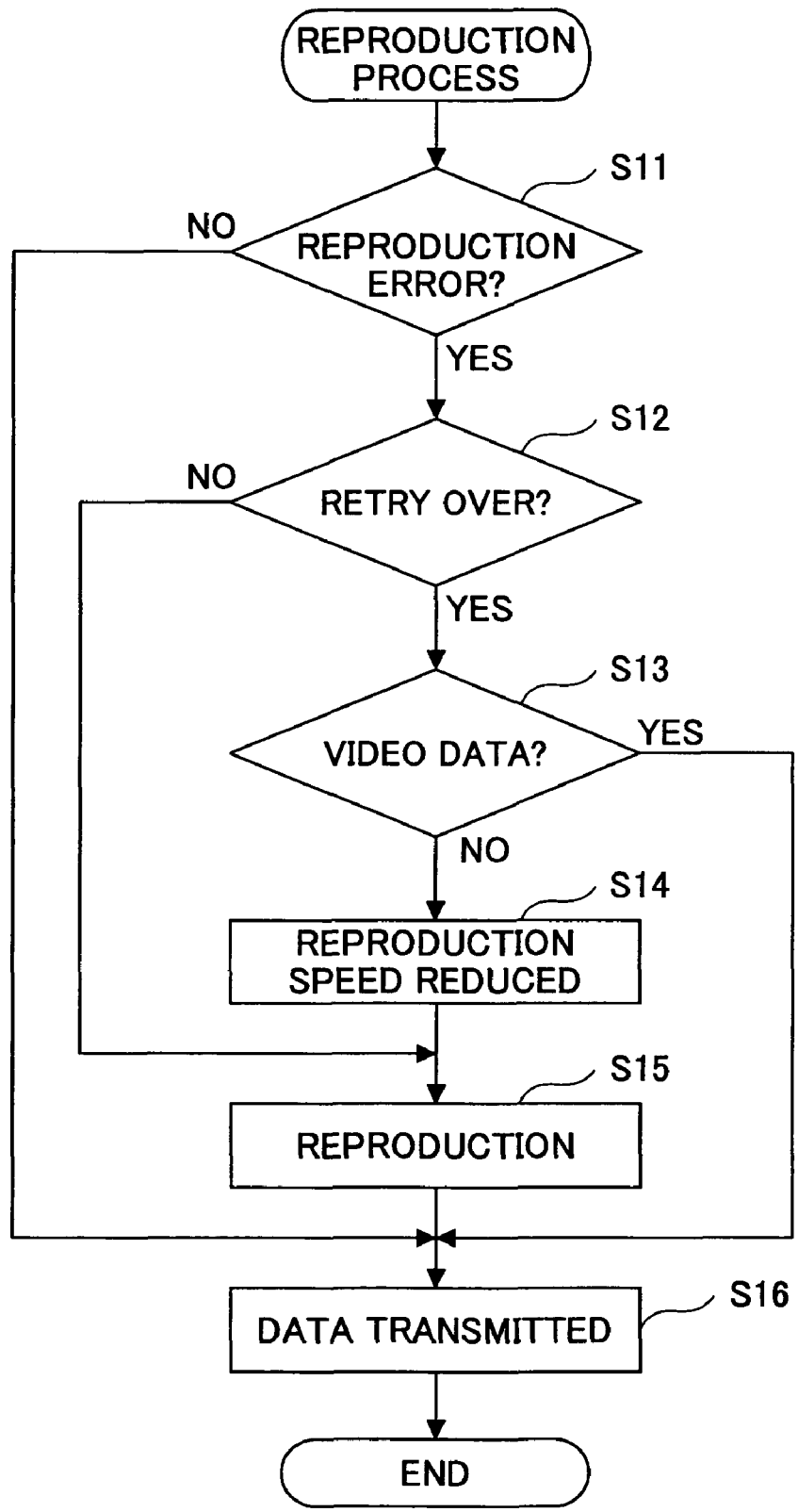
FIG. 3 is a flowchart illustrating a second reproduction process performed by the CD/DVD reproducing/recording drive apparatus of FIG. 1.

FIG. 3 is a flowchart illustrating the second-reproduction process performed by the CD/DVD reproducing/recording drive apparatus of FIG. 1.

In Step S11, the CPU 1 determines whether a reproduction error has occurred while a data item is being reproduced, for example, at a reproduction speed of 4×CLV after recording at a recording speed of 4×CLV. If the CPU 1 determines that a reproduction error has occurred, the CPU 1 determines whether the number of retries allowed at the reproduction speed (for example, at a reproduction speed the same as the recording speed of 4×CLV) has exceeded the limit in Step S12. If the CPU 1 determines that the number of retries has exceeded the limit, the CPU 1 determines whether the data item to be reproduced is a video data item in Step S13. If the CPU 1 determines that the data item is a video data item, the CPU 1 does not change the reproduction speed and maintains the reproduction speed at the same speed as the recording speed (4×CLV) (i.e., if the CPU 1 determines that the data item that caused the reproduction error is a video data item, the CPU 1 does not allow changing of the' reproduction speed during the reproduction). Errors in video data items only cause a slight distortion in the reproduced moving image, and do not seriously affect the reliability. Therefore, in Step S16, the data item containing the error is transmitted to the host computer 12. The second reproduction process is thus completed.

If, on the other hand, the CPU 1 determines that the data item is not a video data item (e.g. the CPU 1 determines that the data item is one that requires reliability such as a document data), the CPU 1 reduces the reproduction speed (e.g. the CPU 1 determines that the error cannot be corrected at 4×CLV and reduces the reproduction speed to 2×CLV) in Step S14 (i.e. if the CPU 1 determines that the data item is other than the video data item, the CPU 1 allows changing the reproduction speed during the reproduction). The data item is reproduced in Step S15, and the reproduced data item is transmitted to the host computer 12 in Step S16. The second reproduction process is thus completed.

If the CPU 1 determines that the reproduction error has not occurred in Step S11, the read data item is transmitted to the host computer 12 in Step S16. If the CPU 1 determines that the number of retries does not exceed the upper limit in Step S12, reproduction is performed at the present reproduction speed (4×CLV) in Step S15 without changing the reproduction speed. Then, the reproduced data item is transmitted to the host computer 12 in Step S16. The second reproduction process is thus completed.

As described above, since the changing of the reproduction speed is allowed in the case of reproducing the data item that requires reliability, the reliability of the data item can be assured. On the other hand, since the changing of the reproduction speed is not allowed in the case of reproducing the video data item, the recording and reproducing performance are prevented from being lowered.

There may be a case where reproduction requests are successively received but no recording command is received after reception of the reproduction requests. In that event, data items excluding video data items may be reproduced at high speed so as to improve the reproducing performance as well as to increase data processing efficiency of the host computer 12. In the case of the video data item, because the data transmission rate for reproducing a moving image on a display is controlled by the host computer 12, the reproducing performance is not directly affected even if the video data item is reproduced at the same speed as the recording speed. For example, if a data item recorded in a DVD is copied to a hard disk drive (HDD), reading the data item from the DVD at higher speed reduces the time required for copying the data item.

Therefore, in the CD/DVD reproducing/recording drive apparatus, if a recording command is not received from the host computer 12 after a predetermined amount of time has passed since the reproduction was started, the CPU 1 may preferably change the reproduction speed to the maximum speed upon determination that the recording will not be performed for some time to come.

As reproduction of data items excluding video data items often requires high reproducing performance, high speed reproduction is needed so as to increase data processing efficiency of the host computer 12. In the case of a video data item, the data transmission rate for reproducing a moving image on a display is controlled by the host computer 12 or a decoder. That is, upper level devices control the performance of reproducing the video data item by extending intervals between reproduction requests or by other methods. Accordingly, the reproducing performance is not directly affected even if the video data item is reproduced at the same speed as the recording speed.

The following describes a third reproduction process performed by the CD/DVD reproducing/recording drive apparatus, wherein the reproduction speed is changed to the maximum speed during reproduction if a recording command is not received from the host computer 12 after a predetermined amount of time has passed since the reproduction was started.

Figure 4:
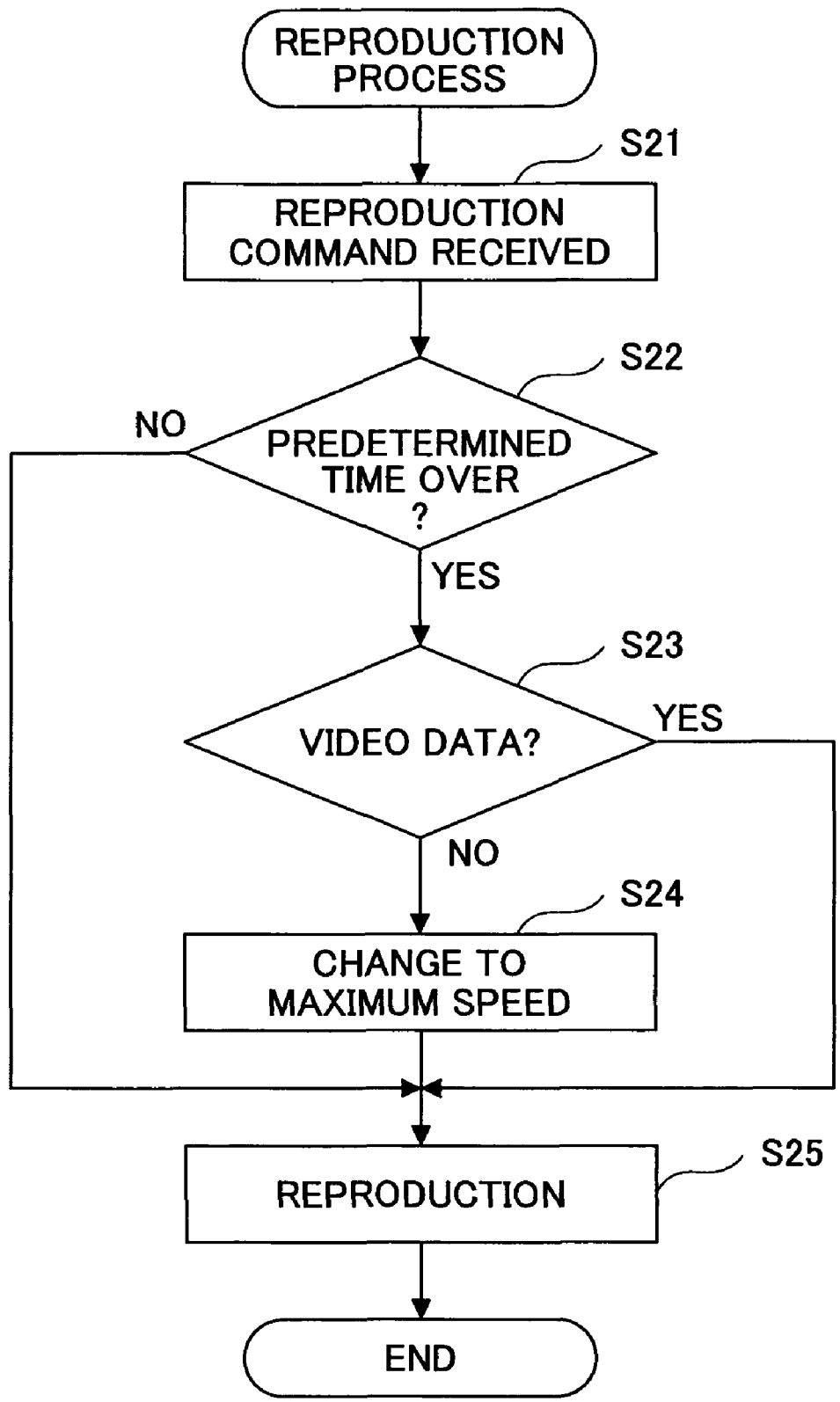
FIG. 4 is a flowchart illustrating a third reproduction process performed by the CD/DVD reproducing/recording drive apparatus of FIG. 1.

FIG. 4 is a flowchart illustrating the third reproduction process performed by the CD/DVD reproducing/recording drive apparatus of FIG. 1.

The CPU 1 starts reproduction upon reception of a data reproduction command from the host computer 12 in Step S21. In Step S22, the CPU 1 determines whether a predetermined amount of time (e.g. 90 seconds) has passed since the reproduction was started. If the CPU 1 determines that the predetermined amount of time has passed, the CPU 1 determines whether the data item recorded in the optical disk is a video data item in Step S23. If the CPU 1 determines that the recorded data item is not the video data item, the CPU 1 changes the reproduction speed to the maximum reproduction speed that can be achieved by the CD/DVD reproducing/recording drive apparatus in Step S24. Then in Step S25, the reproduction is performed at the maximum reproduction speed. The third reproduction process is thus completed.

If in Step S22 the CPU 1 determines that the predetermined amount of time has not passed in Step S22, then in Step S25 the reproduction is performed at a reproduction speed (4×CLV) the same as the recording speed. The third reproduction process is thus completed.

If, in Step S23, the CPU 1 determines that the data item recorded in the optical disk is a video data item, then in step S25 the reproduction is performed at a reproduction speed (4×CLV) the same as the recording speed. Thus the third-reproduction process is completed.

In this way, if a data recording command is not received from the host computer 12 after a predetermined amount of time has passed since the reproduction of the data item was started, the reproduction speed is changed to the maximum speed during the reproduction.

As the changing of the reproduction speed is allowed during reproduction of the data items excluding video data items, the reproducing performance after changing the reproduction speed is improved. Therefore, the data processing efficiency of the host computer 12 can be increased.

The following describes a process performed by the CD/DVD reproducing/recording drive apparatus, wherein the CPU 1 identifies whether a data item is a video data item immediately after recording the data item or before recording the data item.

In the CD/DVD reproducing/recording drive apparatus, the CPU 1 identifies whether a data item is a video data item before starting recording the data item according to a command from the host computer 12.

FIG. 5 shows a format of a SET DATA MODE command, which is a vendor unique command for specifying a recording data mode.

If the value of a VideoMode (VM) bit 20 assigned in bit 0 of byte 5 is "1" in the SET DATA MODE command, the SET DATA MODE command indicates that a data item to be recorded or already recorded in an optical disk is a video data item.

If no such SET DATA MODE command is received, the CPU 1 only records the data item from the host computer 12 without being able to identify whether the data item is a video data item. In this embodiment, the CPU 1 receives such a SET DATA MODE command issued from the host computer 12, and refers to the VM bit 20 of the SET DATA MODE command to identify whether the data item is the video data before or after recording the data item.

A READ(12) command, which is an ATAPI standard command, may be used in place of the SET DATA MODE command.

FIG. 6 shows a format of a READ(12) command.

If a READ (12) command in which a streaming bit 21 is set in bit 7 of byte 10 is issued from the host computer 12, the CPU 1 identifies that the data item is the video data item.

In the READ(12) command, the streaming bit 21 set in bit 7 of byte 10 in the READ (12) indicates that the data item to be recorded or already recorded in an optical disk is a video data item.

The CPU 1 receives such a READ(12) command issued from the host computer 12 before or after recording the data item, and determines whether the streaming bit 21 is set in the READ(12) command to identify whether the data item is a video data.

The type of data item can thus be identified before the data item is recorded into the optical disk.

While the host computer 12 has been described as an information processing apparatus such as a personal computer, the host computer 12 may be a controller unit incorporated in a device such as a back-end device of a CD/DVD reproducing/recording drive apparatus.

What is claimed is:

1. An information recording/reproducing apparatus including a CPU and a memory for recording and reproducing information, comprising:

a recording/reproducing unit that records, responsive to the CPU and the memory, an information item into, and reproduces, responsive to the CPU and the memory, an information item from, a recording medium; and a determining unit that determines, responsive to the CPU and the memory, whether the information item is a video data item, and prevents, responsive to the CPU and the memory, changing a reproduction speed of the recording/reproducing unit during reproduction if the determining unit determines that the information item is a video data item, and allows, responsive to the CPU and the memory, decreasing the reproduction speed during reproduction if the determining unit determines that the information item is not a video data item;

wherein the recording/reproducing unit is configured to alternately record and reproduce the information item to the recording medium;

wherein the recording/reproducing unit is configured to reproduce an already-recorded portion of the information item while recording a yet-to-be-recorded portion of the information item in the recording medium; and wherein the determining unit determines whether an information recording command is received within a predetermined time, and wherein, if the determining unit determines (1) that the information item is not a video item and (2) that an information recording command is not received within the predetermined time, then the determining unit allows increasing of the reproduction speed during reproduction of the information item.

2. The information recording/reproducing apparatus as claimed in claim 1, further comprising: a setting unit that, in a case where the recording/reproducing unit reproduces the already-recorded portion of the information item while recording the yet-to-be-recorded portion of the information item in the recording medium, sets the reproduction speed to the same speed as a recording speed of the recording/reproducing unit during the process of alternately performing the reproduction and the recording, and sets the reproduction speed to a maximum speed when the process of alternately performing the recording and the reproduction is finished.

3. The information recording/reproducing apparatus as claimed in claim 1, further comprising: a setting unit that, in a case where the recording/reproducing unit performs a process of reproduction of the already-recorded portion of the information item while recording the yet-to-be-recorded portion of the information item in the recording medium, sets the reproduction speed to the same speed as a recording speed of the recording/reproducing unit if the reproduction is followed by the recording, and sets the reproduction speed to a maximum speed if the reproduction is not followed by the recording.

4. The information recording/reproducing apparatus as claimed in claim 1, further comprising: a second determining unit that, in a case where the recording/reproducing unit performs a process of reproduction of the already-recorded portion of the information item while recording the yet-to-be-recorded portion of the information item in the recording medium, determines whether the recording of the information item has been performed upon reception of a reproduction command from a host computer, and sets a reproduction speed of a reproduction indicated by the reproduction command to the same speed as a recording speed of the last recording if the second determining unit determines that the recording of the information item has been performed.

5. The information recording/reproducing apparatus as claimed in claim 1, further comprising: a changing unit that changes the reproduction speed to a maximum speed if the information recording command is not received from a host computer after a predetermined amount of time has passed since the reproduction of the information item by the recording/reproducing unit was started.

6. The information recording/reproducing apparatus as claimed in claim 1, further comprising: an identifying unit that identifies whether the information item is a video data item before the recording of the information item is started according to a command from a host computer.

7. The information recording/reproducing apparatus as claimed in claim 1, further comprising: a second determining unit that determines whether the information item is a video data item based on a command sent from a host computer for specifying a recording data mode.

8. The information recording/reproducing apparatus as claimed in claim 7, wherein the second determining unit determines whether the information item is the video data item based on a predetermined bit in the command for specifying the recording data mode.

9. An information recording/reproducing method, comprising:

a recording/reproducing step of recording an information item into, and reproducing an information item from, a recording medium; and a determining step of determining, when a reproduction error occurs during the reproduction of the information item in the recording/reproduction step, whether the information item is a video data item, and preventing changing a reproduction speed during reproduction if it is determined that the information item is a video data item, and allowing changing the reproduction speed during reproduction if it is determined that the information item is not a video data item;

wherein a recording/reproducing unit alternately records and reproduces the information item to the recording medium;

wherein the recording/reproducing unit is configured to reproduce an already-recorded portion of the information item while recording a yet-to-be-recorded portion of the information item in the recording medium; and wherein the determining unit determines whether an information recording command is received within a predetermined time, and wherein, if the determining unit determines (1) that the information item is not a video item and (2) that an information recording command is not received within the predetermined time, then the determining unit allows increasing of the reproduction speed during reproduction of the information item.

10. The information recording/reproducing method as claimed in claim 9, further comprising: a setting step of, in a case where reproduction of the already-recorded portion of the information item from the recording medium and recording of the yet-to-be-recorded portion of the information item into the recording medium are alternately performed in the recording/reproducing step, setting the reproduction speed to the same speed as a recording speed during the process of alternately performing the reproduction and the recording, and setting the reproduction speed to a maximum speed when the process of alternately performing the recording and the reproduction is finished.

11. The information recording/reproducing method as claimed in claim 9, further comprising: a setting step of, in a case where reproduction of the already-recorded portion of the information item from the recording medium and recording of the yet-to-be-recorded portion of the information item into the recording medium are alternately performed in the recording/reproducing step, setting the reproduction speed to the same speed as a recording speed if the reproduction is followed by the recording, and setting the reproduction speed to a maximum speed if the reproduction is not followed by the recording.

12. The information recording/reproducing method as claimed in claim 9, further comprising: a second determining step of, in a case where reproduction of the already-recorded portion of the information item from the recording medium and recording of the yet-to-be-recorded portion of the information item into the recording medium are alternately performed in the recording/reproducing step, determining whether the recording of the information item has been performed upon reception of a reproduction command from a host computer, and setting a reproduction speed of a reproduction indicated by the information reproduction command to the same speed as a recording speed of the last recording if it is determined that the recording of the information item has been performed.

13. The information recording/reproducing method as claimed in claim 9, further comprising: a changing step of changing the reproduction speed to a maximum speed if an information recording command is not received from a host computer after a predetermined amount of time has passed since the reproduction of the information item was started in the recording/reproducing step.

14. The information recording/reproducing method as claimed in claim 9, further comprising: an identifying step of identifying whether the information item is a video data item before the recording of the information item is started according to a command from a host computer.

15. The information recording/reproducing method as claimed in claim 9, further comprising: a second determining step of determining whether the information item is a video data item based on a command sent from a host computer for specifying a recording data mode.

16. The information recording/reproducing method as claimed in claim 15, wherein it is determined whether the information item is the video data item based on a predetermined bit in the command for specifying the recording data mode in the second determining step.

17. A non-transitory recording medium storing a program that executes the information recording/reproducing method of claim 9.

18. An information recording system, comprising:
  a recording/reproducing device including a CPU and a memory that records, responsive to the CPU and the memory, an information item into, and reproduces, responsive to the CPU and the memory, an information item from, a recording medium; and
  a host device including another CPU and another memory, wherein the host device requests, responsive to the other CPU and the other memory, the recording/reproducing device to perform reproduction, and the recording/reproducing device, after receiving the reproduction request from the host device, performs, responsive to the CPU and the memory, the reproduction at a maximum reproduction speed when a data recording operation is finished, and when the data recording operation is not finished, the recording/reproducing device performs, responsive to the CPU and the memory, the reproduction at a reproduction speed the same as a recording speed in the data recording operation;
  wherein the recording/reproducing device is configured to alternately record and reproduce the information item to the recording medium; and
  wherein if a reproduction error occurs during reproduction of the information item, the recording/reproducing device performs the reproduction with the reproduction speed unchanged when the information item is a video data item, and the recording/reproducing device performs the reproduction with a lowered reproduction speed when the information item is not a video data item;
  wherein the recording/reproducing device is configured to reproduce an already-recorded portion of the information item while recording a yet-to-be-recorded portion of the information item in the recording medium; and
  wherein the determining unit determines whether an information recording command is received within a predetermined time, and wherein, if the determining unit determines (1) that the information item is not a video item and (2) that an information recording command is not received within the predetermined time, then the determining unit allows increasing of the reproduction speed during reproduction of the information item.

19. The information recording system as claimed in claim 18, wherein the reproduction speed of the recording/reproducing device is changed to be the maximum reproduction speed if a recording request is not received from the host device even when a time period equaling or longer than a predetermined value elapses after the reproduction is started.

\* \* \* \* \*